United States Patent [19]

Hiroi

[11] Patent Number: 5,200,681
[45] Date of Patent: Apr. 6, 1993

[54] PROCESS CONTROL SYSTEM

[75] Inventor: Kazuo Hiroi, Tokyo, Japan

[73] Assignee: Kabushiki Kaisha Toshiba, Kanagawa, Japan

[21] Appl. No.: 908,754

[22] Filed: Jul. 6, 1992

Related U.S. Application Data

[63] Continuation of Ser. No. 660,003, Feb. 25, 1991, abandoned.

[30] Foreign Application Priority Data

Mar. 9, 1990 [JP] Japan .................. 2-58438

[51] Int. Cl.$^5$ .................................. G05B 11/42
[52] U.S. Cl. .................. 318/610; 318/596; 318/609; 364/161; 364/162
[58] Field of Search ............ 318/560, 561, 503, 609, 318/610, 611, 612, 613, 614, 615, 616, 617, 618, 619, 596; 364/140–169

[56] References Cited

U.S. PATENT DOCUMENTS

| | | | |
|---|---|---|---|
| 4,755,924 | 7/1988 | Hiroi | 364/148 |
| 4,882,526 | 11/1989 | Iino et al. | 318/561 |
| 5,019,958 | 5/1991 | Varga et al. | 318/615 |
| 5,029,066 | 7/1991 | Hiroi | 364/162 |
| 5,059,880 | 10/1991 | Hiroi | 318/610 |

FOREIGN PATENT DOCUMENTS

| | | |
|---|---|---|
| 0333477 | 9/1989 | European Pat. Off. |
| 63-46502 | 2/1988 | Japan . |
| 63-46503 | 2/1988 | Japan . |

Primary Examiner—Paul Ip
Attorney, Agent, or Firm—Finnegan, Henderson, Farabow, Garrett and Dunner

[57] ABSTRACT

A control system is provided for controlling a process system subject to an external disturbance by adjusting the value of a control amount output from the process system to a given target value. The system includes a target value generating unit for generating a given target value, and a main control unit receiving the target value and the control amount value for performing control operations to suppress fluctuation of the control amount value produced by the external disturbance and to adjust the control amount value to the given target value. The main control unit includes a suppressing unit for suppressing fluctuation of the control amount value produced by the external disturbance, an adjusting unit for adjusting a proportional gain of the suppressing unit, derivative time of the suppressing unit, and the control amount value to the given target value, a proportional gain revision coefficient unit for setting a plurality of given proportional gain revision coefficients, and a coefficient selecting unit for selecting the given proportional gain revision coefficient from among the plurality of given proportional gain revision coefficients.

6 Claims, 4 Drawing Sheets

PROCESS CONTROL SYSTEM

This application is a continuation, of application Ser. No. 07/660,003, filed Feb. 25, 1991, now abandoned.

BACKGROUND OF THE INVENTION

This invention relates to a process control system, and more particularly to a process control system having two-degrees of freedom for proportional control operation.

Proportional and Integration (PI) or Proportional, Integration and Derivative (PID) control devices have been widely utilized in all fields of production, since the inception of process control. Indeed, in the field of instrumentation, PID control devices have become indespensable.

In the past, various kinds of control systems have been proposed. A shift has now taken place from analog systems to digital control and calculating systems. However, the leading role of plant operation control in the application of PID control devices remains unchanged.

The basic equation of such PID control calculation is:

$$MV(s) = K_P \left( 1 + \frac{1}{T_I \cdot s} + \frac{T_D \cdot s}{1 + \eta \cdot T_D \cdot s} \right) E(s) \quad (1)$$

where MV(s) is the operating signal, E(s) is the deviation, Kp is the proportional gain, $T_I$ is the integral time, $T_D$ is the deviation time, s is the Laplace operator, and (1/η) is the derivative gain.

Such PID control calculation is called a PID control calculation system with one degree of freedom.

This constitutes a so-called system with one degree of freedom, in which only one set of PID control constants can be set.

It is of course impossible to optimize simultaneously both the external disturbance suppression characteristic and the target value tracking characteristic.

In general, a control system employing PI or PID control operations must satisfy the functions of both an external disturbance suppression characteristic and a target value tracking characteristic.

The former, the external disturbance suppression characteristic, indicates how best to suppress the effect of external disturbances.

The latter, the target value tracking characteristic, indicates how best to track the target value of the process value when this target value is changed.

In an ordinary PI or PID control system, the values of the PI or PID control constants for optimal suppression of the effect of changes in external disturbance and the values of the PI and PID control constants for optimal tracking of changes in target value are very different, so that these two characteristics can not be optimized simultaneously. In fact, they are in an antinomic relationship.

Specifically, if the PID control constants are set so as to optimally suppress the effect of changes in external disturbances, the target value tracking characteristic becomes oscillatory. On the other hand, if the PID control constants are set so as to optimally track changes in target value, the external disturbance suppression characteristic becomes very soft.

Development of a technique for simultaneously optimizing the external disturbance suppression characteristic and target value tracking characteristic of such PID control devices is therefore desirable.

To deal with this, in 1963, Issac M. Horowitz announced the basic concept of a two degrees of freedom PI or PID (herein below abbreviated as 2 DOF PID) algorithm in which two sets of PID control constants could be independently set. 2 DOF PID systems based on this concept have been implemented in Japan also in recent years, and are making a large contribution to improvement of plant operation control.

FIG. 1 is a block diagram of a conventional two degrees of freedom type PID control system wherein P operation and D operation are given two degrees of freedom. In this system, there is provided a target value filter 11 that carries out calculation processing to obtains the proportional gain and derivative time in the two degrees of freedom type system. The system receives a target value SV from a target value generating unit 10 and feeds to a deviation calculation unit 13 a control amount PV from a system 12 to be controlled and filter output SVo obtained from target value filter 11. Deviation calculation unit 13 performs the calculation (SVo−PV) to find the deviation E, which is then fed to a PI control calculation unit 14. This PI control calculation unit 14 receives deviation E and performs a PI control calculation to obtain an operating signal MV, which is then fed to an adding unit 15. This adding unit 15 combines operating signal MV and an external disturbance signal D by adding them, and applies the combined added signal which is obtained to the controlled system 12, thereby performing control such that target value SVo=control amount value PV.

In target value filter 11, coefficient unit 21 multiplies target value SV by proportional gain revision coefficient α for realizing two degrees of freedom for proportional control operation, to obtain a output (SV·α), which is then fed to an adding unit 22. A subtraction unit 23 then subtracts the output (SV·α) of coefficient unit 21 from target value SV. The subtraction output SV(1−α) which is obtained is then supplied to a subtraction unit 24.

The output (SV·α) of the coefficient unit 21 is also fed to a coefficient unit 25 which multiplies this output (SV·α) by derivative time revision coefficient γ for realizing two degrees of freedom of derivative control operation to obtain a multiplied output (SV·α·γ), which is then fed to a subtraction unit 26.

This subtraction unit 26 subtracts control amount PV from multiplied output (SV·α·γ), to obtain a subtracted output (SV·α·γ)−PV, which is fed to a coefficient unit 27, where this subtraction output (SV·α·γ)−PV is multiplied by derivative gain 1/η. The output of this coefficient unit 27 is branched into two outputs. One of these outputs is input directly to a subtraction unit 28. The output is input to the negative input of subtraction unit 28 through a first order delay element 29.

In subtraction unit 28, the output of first order delay element 29 is subtracted from the output of coefficient means 27, and the result is then supplied to subtraction unit 24. This subtraction unit 24 then subtracts the output of subtraction unit 28 from the output of subtraction unit 23. The output obtained is given an appropriate delay by passing it through a first order delay element 30 whose time constant is the integral time $T_I$. An adding unit 31 then adds the output of this first order delay element 30 and the output of subtraction unit 28. Adding unit 22 then adds this to the output of a coefficient unit 21, to obtain the output SVo of target value filter 11.

The following relationship therefore subsists between the output SVo of target value filter 11 and target value SV and control amount value PV.

$$SVo = \frac{1 + \alpha \cdot T_I \cdot s}{1 + T_I \cdot s} SV + \qquad (2)$$

$$\frac{T_D \cdot s}{1 + \eta \cdot T_D \cdot s} \cdot \frac{1}{1 + Ts} (\alpha \cdot \gamma \cdot SV - PV)$$

As a result, taking the target value SV component in operating signal MV to be MVs, from FIG. 1 and equation (2) above, we have the following equation.

$$\frac{MVs}{SV} = Cs(s) = Kp\left(\alpha + \frac{1}{T_I \cdot s} + \frac{\alpha \cdot \gamma \cdot T_D \cdot s}{1 + \eta \cdot T_D \cdot s}\right) \qquad (3)$$

And taking the control amount value PV component in the operating signal MV as MVp, we likewise, obtain from FIG. 1 and equation (2) above the following equation.

$$\frac{-MVp}{SV} = Cp(s) = Kp\left(1 + \frac{1}{T_I \cdot s} + \frac{T_D \cdot s}{1 + \eta \cdot T_D \cdot s}\right) \qquad (4)$$

Consequently, as is clear from these equations (3) and (4), a simple PID control is achieved of the control amount value PV. But regarding the target value SV, the proportional gain revision coefficient $\alpha$ and derivative gain revision coefficient $\gamma$ can be respectively independently set. Thus, so-called two degrees of freedom PID control is achieved.

Although this 2 DOF PID control device has various advantages, the following drawbacks have been pointed out. Specifically, as shown in equation (3) and (4), there are three different ways in which the derivative control operation may be applied to the target value SV and control amount value PV (influenced by external disturbance D), depending on the way in which $\gamma$ and $T_D$ are set (see Table 2 below). In actual industrial application these combinations may be employed selectively, or may be altered during operation, depending on the characteristics of the process and the requirements of control.

As a result, the values of the coefficient $\alpha$ used to give the proportional gain revision coefficient for realizing two degrees of freedom differ greatly, depending on which of the above combinations is selected. Consequently, in a plant employing several hundred to several thousand PID control loops, it is necessary to change the setting of the value of coefficient $\alpha$ every time. This takes a considerable amount of time. It is also possible that the value of the coefficient $\alpha$ that is to be set might be forgotten.

If therefore the operation of setting the value of coefficient for realizing the two degrees of freedom for proportional control operation could be carried out smoothly, this would contribute greatly to more general application of 2 DOF PID.

SUMMARY OF THE INVENTION

It is an object of this invention to improve the controllability of a process control system.

Another object is to make it possible to automatically set a desirable value of proportional gain revision coefficient realizing two degrees of freedom for proportional control operation in a process control system.

Additional objects and advantages will be obvious from the description which follows, or may be learned by practice of the invention.

The foregoing objects are achieved according to the present invention by providing a system for controlling a process system subject to an external disturbance by adjusting the value of a control amount output from the process system to a given target value. The system includes target value generating means for generating a given target value, and main control means receiving the target value and the control amount value for performing control operations to suppress fluctuation of the control amount value produced by the external disturbance and to adjust the control amount value to the given target value. The main control means includes suppressing means for performing at least proportional and integral control operations from a choice of proportional, integral and derivative control operations based on control constants including at least proportional gain, integral time from a choice of proportional gain, integral time and derivative time adjusted to suppress fluctuations of the control amount value produced by the external disturbance, adjusting means for performing at least proportional and integral control operations from a choice of proportional, integral and derivative control operations according to at least a given proportional gain revision coefficient to adjust a proportional gain of the suppressing means from a choice of the given proportional gain revision coefficient adjusted and a given derivative time revision coefficient to adjust a derivative time of the suppressing means, to adjust the control amount value to the given target value, proportional gain revision coefficient means for setting a plurality of given gain revision coefficients, and coefficient selecting means for selecting the given proportional gain revision coefficient from among the plurality of given gain revision coefficients according to the result of discriminating whether a derivative control operation of the suppressing means is performed and whether a derivative control operation of the adjusting means is performed.

DETAILED DESCRIPTION OF THE PREFERRED EMBODIMENTS

Figure 1:
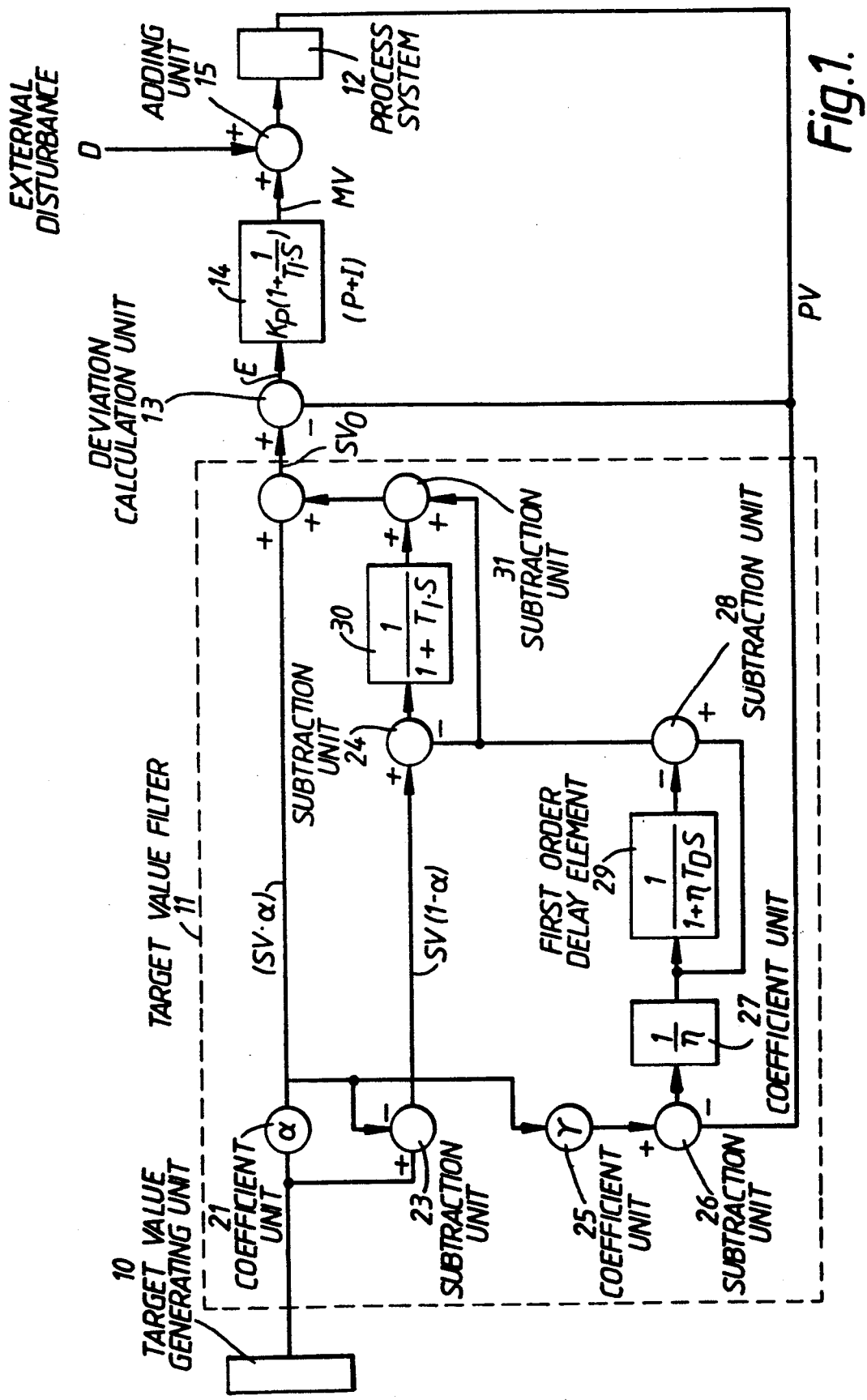
FIG. 1 is a block diagram of a conventional two degrees of freedom type PID control system.

The following is an explanation of an embodiment of this invention with reference to drawings. If the proportional gain and its derivative time which are optimal for suppression of external disturbance are Kp and $T_D$, respectively, and the proportional gain and its time derivative which are optimal for the tracking of the target value are Kp* And $T_D$* respectively, the following equations (5) and (6) can be obtained from equations (3) and (4).

$$Kp^* = a \cdot Kp \quad a = (Kp^*/Kp) \quad (5)$$

$$Kp^* \cdot T_D = kp \cdot a \cdot \gamma \cdot T_D \quad \gamma = T_D^*/T_D) \quad (6)$$

Many methods have previously been proposed for finding control constants from the time response of a system to be controlled. An example of these which is frequently employed is the CHR (Chien, Hrones and Reswick) method shown in Table 1.

TABLE 1

Relationship between control constants and control operation mode

| controlled system (transfer function) | input type | control mode | Kp proportional gain | $T_I$ integral time | $T_D$ derivative time | note |
|---|---|---|---|---|---|---|
| $\frac{K \cdot e^{-LS}}{1 + T \cdot s}$ | External Disturbance | P<br>PI<br>PID | 0.3T/KL<br>0.6T/KL<br>0.95T/KL | —<br>4L<br>2.4L | —<br>—<br>0.4L | Minimum settling time without overshoot |
| $\frac{K \cdot e^{-LS}}{1 + T \cdot s}$ | External Disturbance | P<br>PI<br>PID | 0.7T/KL<br>0.7T/KL<br>1.2T/KL | —<br>2.3L<br>2L | —<br>—<br>0.42L | Minimum settling time with 20% overshoot |
| $\frac{K \cdot e^{-LS}}{1 + T s}$ | Target value | P<br>PI<br>PID | 0.3T/KL<br>0.35T/KL<br>0.6T/KL | —<br>1.2T<br>T | —<br>—<br>0.5L | Minimum settling time without overshoot |
| $\frac{K \cdot e^{-LS}}{1 + T \cdot s}$ | Target value | P<br>PI<br>PID | 0.7T/KL<br>0.6T/KL<br>0.95T/KL | —<br>T<br>1.35T | —<br>—<br>0.47L | Minimum settling time with 20% overshoot |

In Table 1, K is the gain of the control system, T is the time constant, and L is the dead time.

From Table 1 and equation (5), proportional gain revision coefficient $a$ for realizing two degrees of freedom for proportional control operation can be obtained, as shown in Table 2, depending on the combination of whether or not there is a derivative control action on the target value SV and whether or not there is a derivative control operation on the control amount (which is influenced by an external disturbance).

TABLE 2

Relationship between control mode and proportional gain revision coefficient

| | Control mode Target value - External | | | $a$ | |
|---|---|---|---|---|---|
| No | Disturbance | $\gamma$ | $T_p$ | (without overshoot) | (with 20% overshoot) |
| 1 | PI-PID | =0 | ≠0 | 0.37 | 0.50 |
| 2 | PI-PI | Arbitrary | =0 | 0.58 | 0.86 |
| 3 | PI-PID | ≠0 | ≠0 | 0.63 | 0.79 |

As is clear from Table 2, the value of the proportional gain revision coefficient $a$ differs greatly, from 0.37 to 0.63, depending on the control mode, i.e., on the combination of whether or not a derivative control action is performed on the target value SV and whether or not a derivative control action is performed on the control amount (which is influenced by a disturbance).

Figure 2:
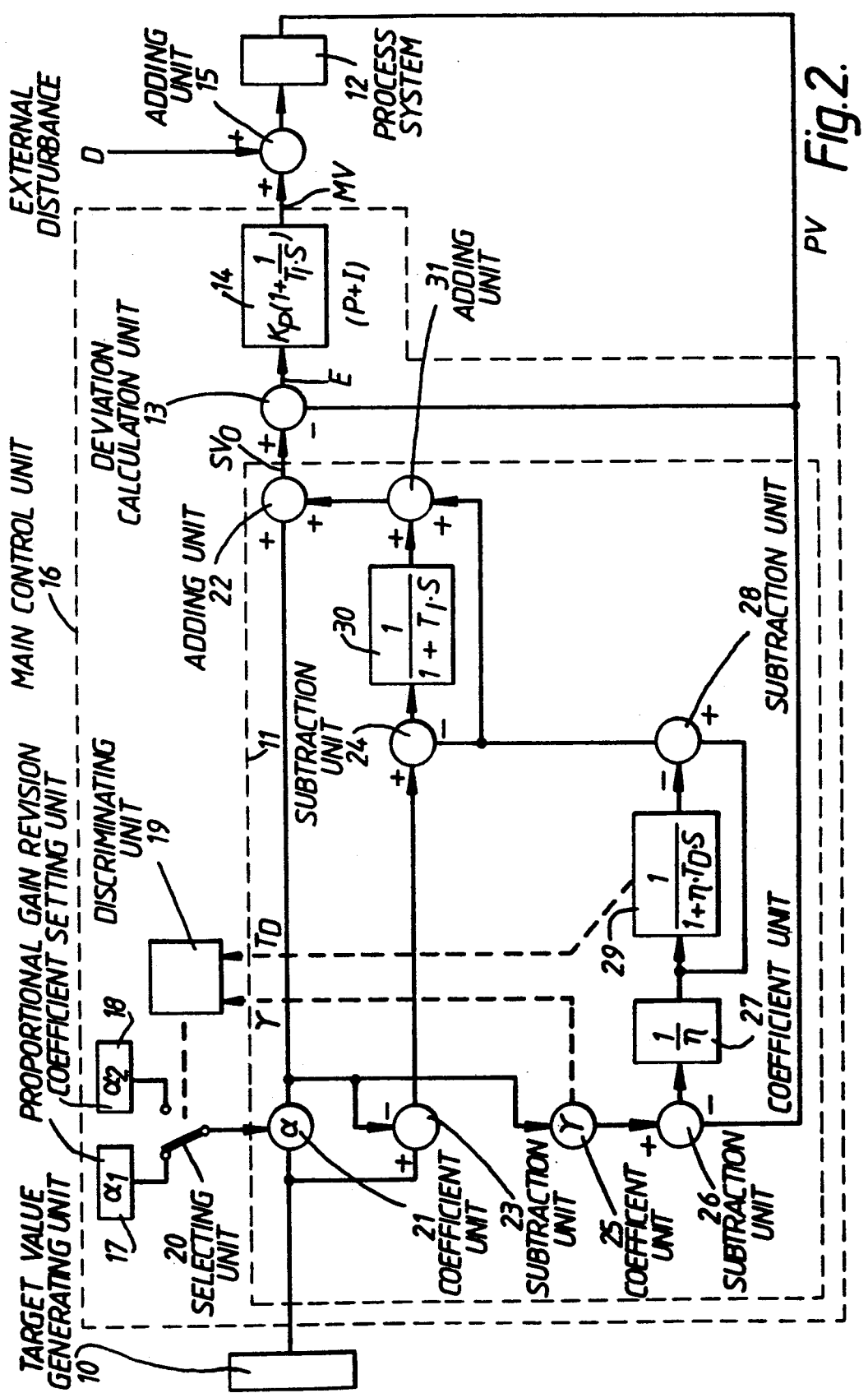
FIG. 2 is a block diagram of a preferred embodiment of a two degrees of freedom type PID control system according to the invention.

Next, an embodiment of the invention will be described with reference to FIG. 2. As shown in FIG. 2, a main control unit 16 having the function of discriminating the combination of derivative time $T_D$ and derivative time revision coefficient $\gamma$ for two degrees of freedom of derivative control operation, is utilized. Items in FIG. 2 which are the same as items in FIG. 1 are given the same reference numerals and a detailed description is omitted.

Specifically, this device is constructed by providing, within target value filter 11, proportional gain revision coefficient setting units 17, 18 that set two (or, in other cases more,) coefficients $a1$, $a2$, of proportional gain in accordance, for example, with Table 2. Also provided is a discriminating unit 19 that discriminates the combination of derivative time $T_D$ and the coefficient $\gamma$ of the derivative time by inputting the value of the derivative time $T_D$ that is set by a first order delay element 29, and the coefficient $\gamma$ of derivative time that is set by a coefficient unit 25. Further provided is a selecting unit 20 that automatically selects the optimum value from among the proportional gain revision coefficients that are set beforehand by proportional gain revision coefficient setting units 17 and 18 in accordance with the result of descrimination by descriminating unit 19, i.e., in accordance with changes of the combination of derivative time $T_D$ and derivative time revision coefficient $\gamma$. The coefficient $a$ of proportional gain selected by this selecting unit 20 is set in coefficient unit 21.

This will now be explained by a concrete example. Discriminating unit 19 inputs the value of the derivative time $T_D$ that is set by first order delay element 29 and the coefficient $\gamma$ of derivative time that is set by coefficient unit 25. In accordance with this coefficient $\gamma$ and derivative time $T_D$, it then sets in coefficent unit 21 the following:

(I) when $\gamma = 0$ and $T_D$ is not equal to 0, from Table 2, proportional gain revision coefficient $a1 = 0.37$ (II) otherwise, proportional gain revision coefficient $a2 = 0.60$.

The reason for choosing the value "0.60" in case (II) above is that, in Table 3, 0.58 and 0.63 are close to each other, so they are substituted by a single intermediate value.

Consequently, the very different values of the coefficient $a$ depending on the combination of whether or not there is a derivative control action on the target value SV and whether or not there is a derivative control action on the control amount (which is influenced by external disturbance) are identified. Also, the optimum proportional gain revision coefficients are set beforehand in proportional gain revision coefficient setting units 17 and 18, and discriminating unit 19 fetches one of the optimum proportional gain revision coefficients from proportional gain revision coefficient setting units 17 or 18 after discriminating derivative time $T_D$ and the coefficient $\gamma$ of derivative time, and sets this optimum proportional gain revision coefficient automatically in coefficient unit 21. This makes it possible to eliminate the troublesome operation of changing the setting of the proportional gain revision coefficient every time, depending on the combination of derivative time $T_D$ and the coefficient $\gamma$ of derivative time, which is previously required. This enables an enormous improvement in the setting operation, in particular in the case of large plants, where several hundred to several thousand control loops are employed.

Furthermore, since the value of the coefficient $\alpha$ of proportional gain can always be automatically set, optimal overall two degrees of freedom PID control can be maintained.

Figure 3:
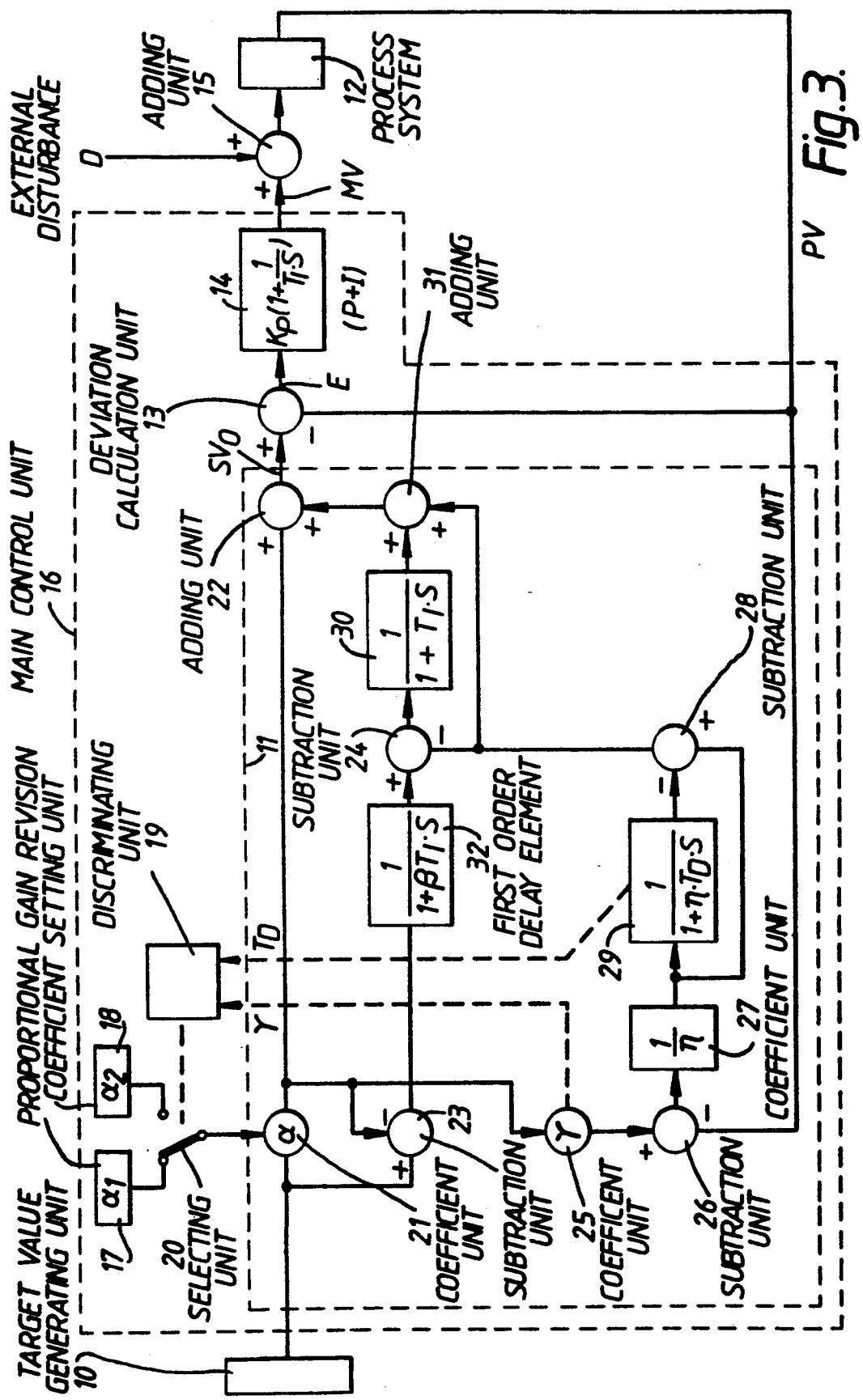
FIG. 3 is a block diagram of another preferred embodiment of the invention.

Next, another embodiment of the invention is shown in FIG. 3. In this embodiment, a first order delay element 32 is inserted between substraction unit 23 and substraction unit 24 of target value filter 11. Complete two degrees of freedom PID control is obtained by obtaining the integral time $T_I$ equivalently in two degrees of freedom form, by applying a coefficient $\beta$ to the time constant of this first order delay element 32, i.e. by using a time constant $\beta \cdot T_I$.

The optimum value of the coefficient $\alpha$ of proportional gain can of course be set in coefficient unit 21 in accordance with the combination of derivative time $T_D$ and the coefficient $\gamma$ of derivative time, in the same way as in FIG. 2, with this target value filter 11, also.

Figure 4:
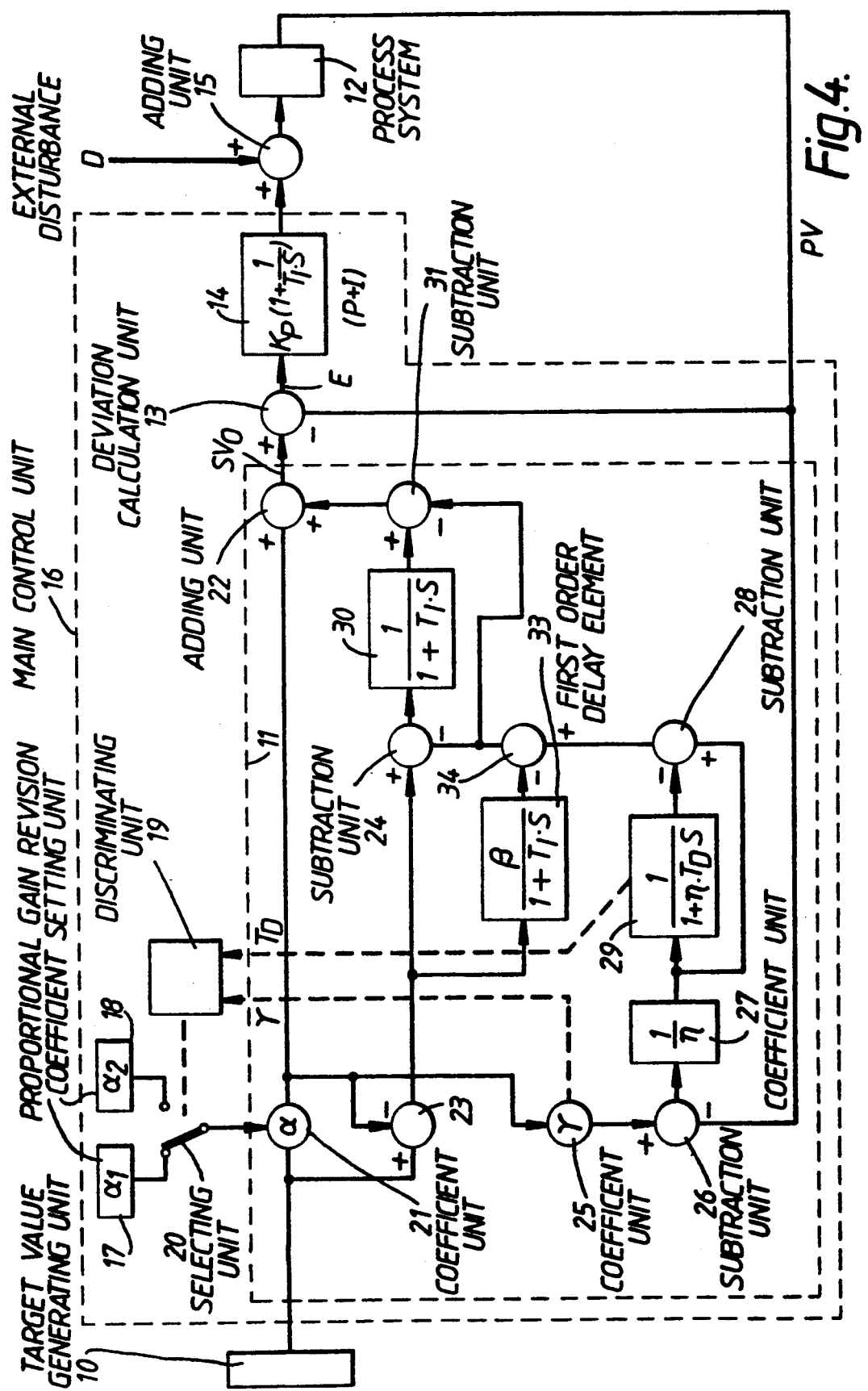
FIG. 4 is a block diagram of a further preferred embodiment of the invention.

FIG. 4 shows yet a further embodiment of the invention. In the device of this embodiment, a first order delay element 33 is provided on the output side of subtraction unit 23 of target value filter 11, and a subtraction 34 that subtracts the output of this first order delay element 33 from the output of subtraction unit 28 is provided. Full two degrees of freedom PID control is obtained by equivalently obtaining the time integral time $T_I$ in two degrees of freedom form, by using the coefficient of $\beta$ with this first order delay element 33. In this case also, the optimum value of the coefficient $\alpha$ of proportional gain can be set in coefficient unit 21, depending on the combination of derivative time $T_D$ and the coefficient $\gamma$ of derivative time.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

As described above, with this invention, the optimum coefficient of proportional gain can be automatically selected and set in accordance with the combination of derivative time $T_D$ and the coefficient $\gamma$ of derivative time. A two degrees of freedom control device can thus be provided that is easy to adjust, and that offers high controllability and versatility.

What is claimed is:

1. A control system for controlling a process system subject to an external disturbance by adjusting the value of a control amount signal output from the process system to a target signal value, the control system comprising:

target signal generating means for generating a target signal having the target signal value; and main control means, operatively coupled to the target value signal generating means to receive the target signal and the control amount signal for suppressing fluctuation of the control amount signal value produced by the external disturbance and for adjusting the control amount signal value to the target signal value, the main control means including suppressing means for performing at least proportional and integral control operations on the control amount signal from a choice of proportional, integral and derivative control operations based on control constants including at least one of proportional gain and integral time from a choice of proportional gain, integral time and derivative time values, at least one of the control constants being adjusted to suppress fluctuation of the control amount signal value produced by the external disturbance, adjusting means for performing at least proportional and integral control operations on the target signal and the control amount signal from a choice of proportional, integral and derivative control operations according to at least a proportional gain revision coefficient to adjust the proportional gain applied by the suppressing means from a choice of the proportional gain revision coefficient and a derivative time revision coefficient to adjust a the derivative time applied by the suppressing means, and to adjust the control amount signal value to the target signal value, proportional gain revision coefficient means for setting a plurality of proportional gain revision coefficients, and coefficient selecting means for discriminating whether the suppressing means performs a derivative control operation and whether the adjusting means performs a derivative control operation, and for selecting one of the proportional gain revision coefficients from among the plurality of proportional gain revision coefficients according to the discrimination result.

2. The system of claim 1, wherein:

the proportional gain revision coefficient means comprises means for setting two proportional gain revision coefficients; and the coefficient selecting means comprises means for selecting the selected proportional gain revision coefficients according to the discrimination result between a first case where the suppressing means performs a derivative control operation and the adjusting means does not perform a derivative control operation, and other cases.

3. The system of claim 1, further comprising integral time revision coefficient means for adjusting the time integral applied by the surpressing means according to a time integral revision coefficient to adjust the control amount signal value to the target signal value.

4. A method of controlling a process system subject to an external disturbance by adjusting the value of a control amount signal output from the process system to a target signal having a target signal value, the method comprising the steps of:

using a target signal generating unit to generate the target signal value;

performing control operations to suppress fluctuation of the control amount signal value produced by the external disturbance and to adjust the control amount signal value to the target signal value, wherein the step of performing control operations includes performing at least proportional and integral control operations on the control amount signal from a choice of proportional, integral and derivative control operations based on control constants including at least one of proportional gain and integral time from a choice of proportional gain, integral time and derivative time to suppress fluctuation of the control amount signal value produced by the external disturbance, performing at least proportional and integral control operations on the target signal and the control amount signal from a choice of proportional, integral and derivative control operations according to at least a proportional gain revision coefficient to adjust the proportional gain from a choice of the proportional gain revision coefficient and a derivative time revision coefficient to adjust the derivative time and to adjust the control amount signal value to the target signal value, setting a plurality of proportional gain revision coefficients, discriminating whether the fluctuation suppressing substep includes a derivative control operation and whether the adjusting substep includes a derivative control operation, and selecting one of the proportional gain revision coefficients from among the plurality of proportional gain revision coefficients according to the discrimination result; and using a combination of the control amount signal and the target signal to control the process system.

5. The method of claim 4 wherein:

the step of setting a plurality of gain revision coefficients comprises the step of setting two proportional gain revision coefficients; and the step of selecting the selected proportional gain revision coefficient comprises the step of selecting the selected proportional gain revision coefficients according to the result of discriminating between a first case where a derivative control operation for suppressing the fluctuation of the control amount signal value is performed and a derivative control operation for adjusting the control amount signal value to the target signal value is not performed, and other cases.

6. The method of claim 4, further comprising the step of adjusting the time integral according to a time integral revision coefficient to adjust the control amount signal value to the target signal value.

* * * * *

UNITED STATES PATENT AND TRADEMARK OFFICE
CERTIFICATE OF CORRECTION

PATENT NO. : 5,200,681
DATED : April 06, 1993
INVENTOR(S) : Kazuo Hiroi

It is certified that error appears in the above-indentified patent and that said Letters Patent is hereby corrected as shown below:

Claim 1, column 8, line 28, after "adjust" delete --a--.

Claim 3, column 8, line 55, change "surpressing" to --suppressing--.

Signed and Sealed this

Fifth Day of April, 1994

Attest:

BRUCE LEHMAN

Attesting Officer        Commissioner of Patents and Trademarks